Nov. 21, 1961 M. FRESARD 3,009,429
ACCESSORIES FOR FACILITATING THE MAKING OF
BUTTON-HOLES, PARTICULARLY BY MEANS
OF A SEWING-MACHINE
Filed June 11, 1957 9 Sheets-Sheet 4

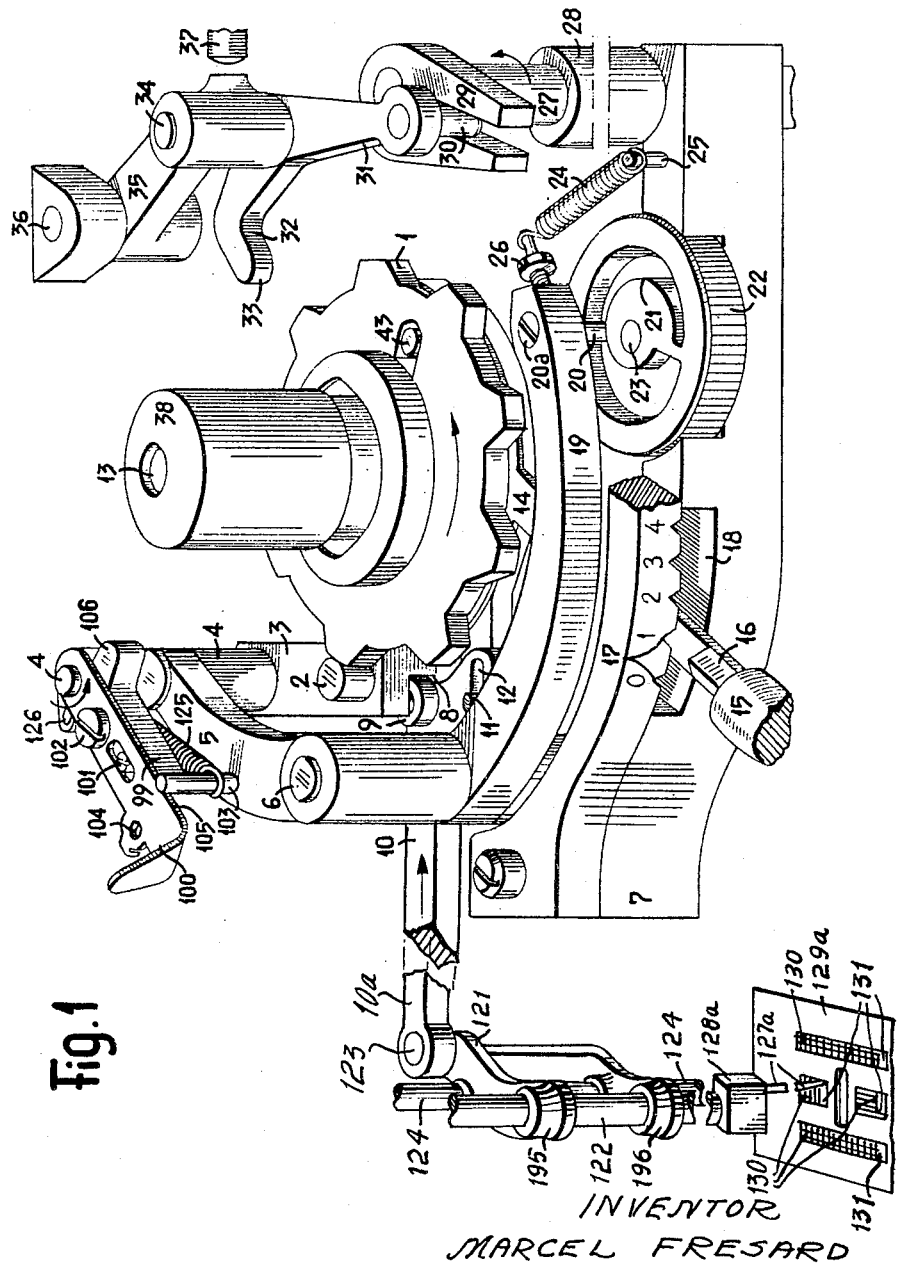

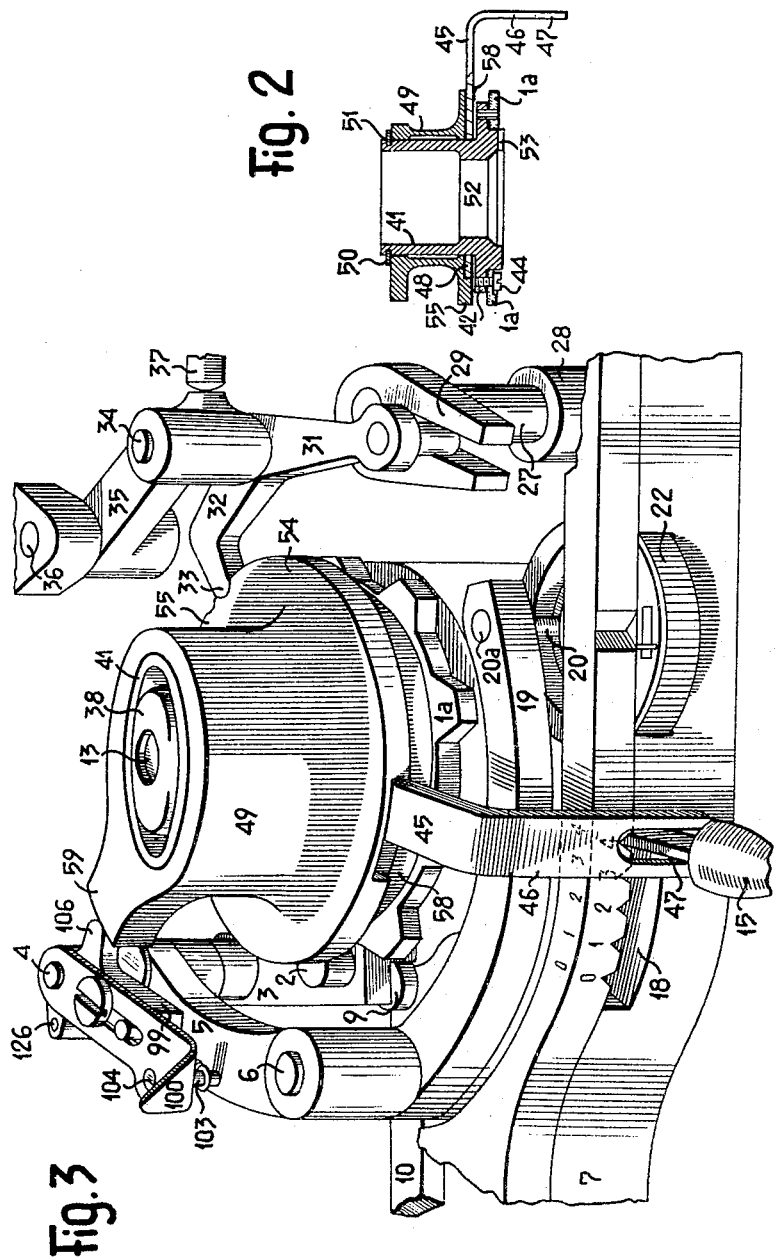

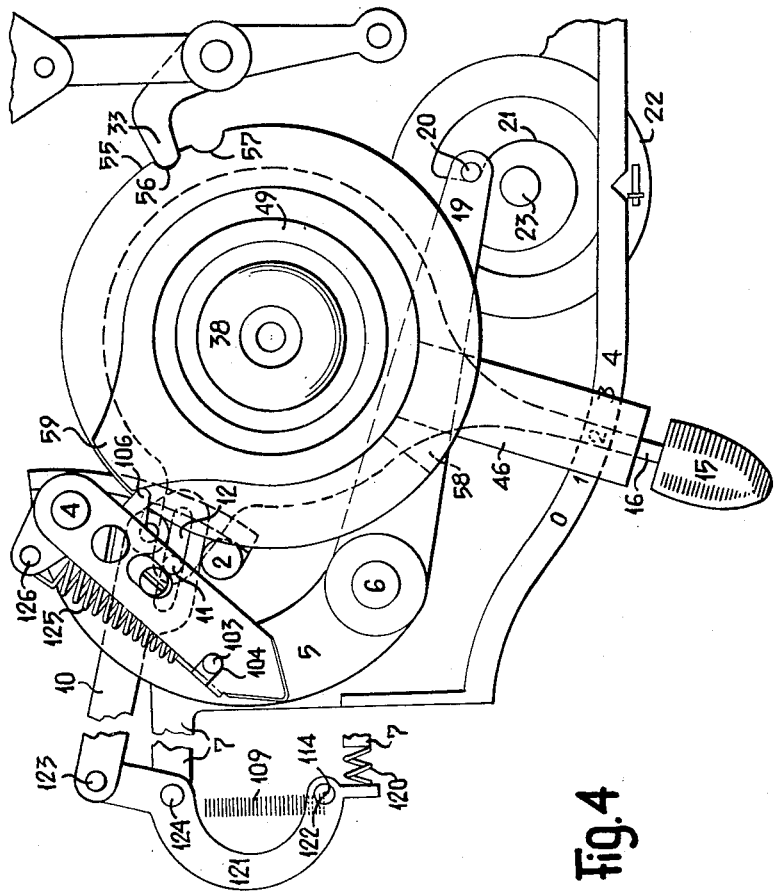

INVENTOR
MARCEL FRESARD
By

Nov. 21, 1961   M. FRESARD   3,009,429
ACCESSORIES FOR FACILITATING THE MAKING OF
BUTTON-HOLES, PARTICULARLY BY MEANS
OF A SEWING-MACHINE
Filed June 11, 1957   9 Sheets-Sheet 6
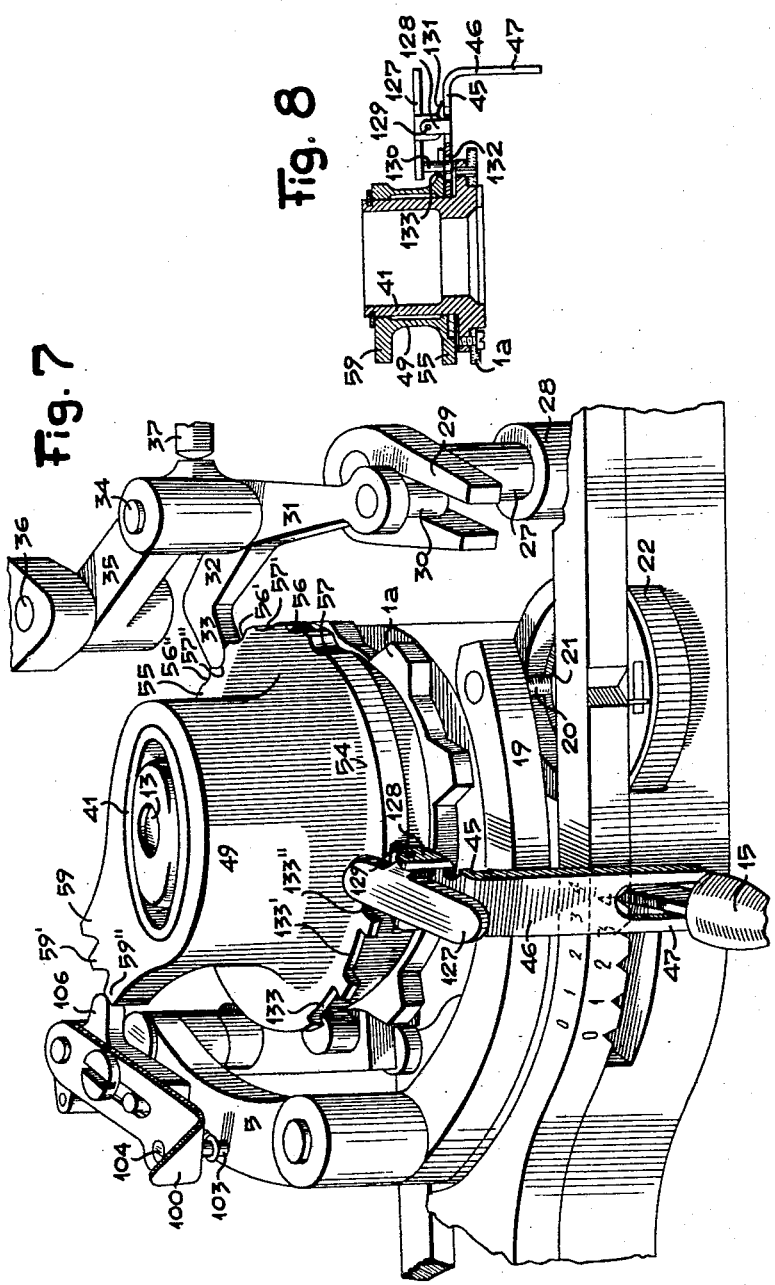
INVENTOR
MARCEL FRESARD
By Nov. 21, 1961    M. FRESARD    3,009,429
ACCESSORIES FOR FACILITATING THE MAKING OF
BUTTON-HOLES, PARTICULARLY BY MEANS
OF A SEWING-MACHINE
Filed June 11, 1957    9 Sheets-Sheet 7
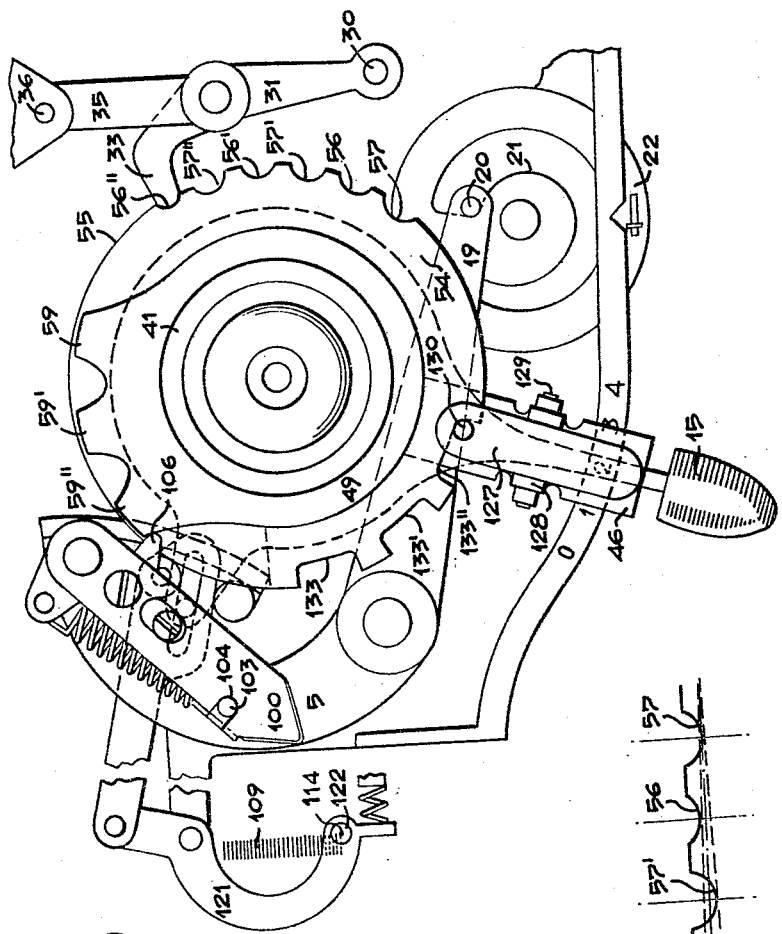
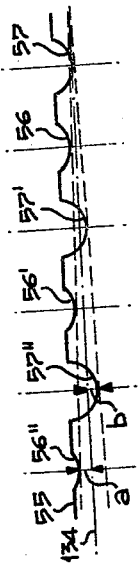
INVENTOR
MARCEL FRESARD

INVENTOR
MARCEL FRESARD

Nov. 21, 1961 M. FRESARD 3,009,429
ACCESSORIES FOR FACILITATING THE MAKING OF
BUTTON-HOLES, PARTICULARLY BY MEANS
OF A SEWING-MACHINE
Filed June 11, 1957 9 Sheets-Sheet 9

INVENTOR
MARCEL FRESARD

United States Patent Office 3,009,429
Patented Nov. 21, 1961

3,009,429
ACCESSORIES FOR FACILITATING THE MAKING OF BUTTON-HOLES, PARTICULARLY BY MEANS OF A SEWING-MACHINE
Marcel Fresard, Geneva, Switzerland, assignor to Mefina S.A., Fribourg, Switzerland, a corporation of Switzerland
Filed June 11, 1957, Ser. No. 664,941
Claims priority, application Switzerland Aug. 19, 1956
5 Claims. (Cl. 112—158)

The present invention has for its subject an accessory for facilitating the making of button-holes, particularly by means of a sewing machine, wherein the needle bar is capable of being subjected to lateral movements, controlled through the medium of a feeler finger held by a spring in contact with the contour of a primary cam controlling, at each of its revolutions, a cyclic number of stitches, an adjusting member enabling the amplitude of these lateral movements to be varied, a device enabling the centering position of the needle to be varied relatively to the needle hole plate, said device comprising a support carrying the hinge axis of the feeler finger of the primary cam, said support being capable of being moved into various positions by means of an operating member, a mechanism enabling the amplitude and directions of movement of the feeder to be varied.

Some sewing machines are already known comprising mechanisms adapted to facilitate the production of button-holes. However, all these machines of known construction have "an indirect control," that is to say machines generally comprising a first cam with a triangular profile imparting to the needle bar a lateral movement determining a zig-zag point which is modulated in amplitude by means of a cam device secured fixedly or interchangeable. There is no difficulty in such a machine "with indirect control" to apply an apparatus for facilitating the making of button-holes.

The sewing machine defined hereinafter and to which is adapted to be applied the accessory according to the invention, is a machine "with direct control," a machine to which an accessory has hitherto not been provided for facilitating the formation of button-holes, whilst guaranteeing that the two sides of each button-hole are rigorously of the exact length, or reciprocally that each side of the button-hole comprises the same number of stitches.

The accessory of this invention comprises at least an auxiliary control plate capable of occupying two combined active angular positions, the contour of said auxiliary control plate acting on the mechanism for adjusting the amplitude and the direction of the movements of the feeder of the machine in such a manner that in the first position it imparts a uniform movement of advance to the feeder and in the second position, a uniform return movement of the same amplitude, the selection of the two positions of the auxiliary control plate being produced by the member for adjusting the amplitude of the lateral movements of the needle bar by reason of a connecting member with which the accessory is provided and which is interposed between the auxiliary control plate and the said adjusting member.

Two forms of construction of the accessory according to the invention, applied to a sewing machine are shown diagrammatically and by way of example in the accompanying drawings, wherein:

FIG. 1 is a perspective view of the mechanism for controlling the lateral movements of the needle bar of a sewing machine with direct control.

FIG. 2 is a view in axial section of the accessory according to the first form of construction.

FIG. 3 shows in perspective said accessory when mounted on the sewing machine shown partly in FIG. 1.

FIG. 4 is a diagram showing the accessory in position on the sewing machine, a part of the latter being drawn to a reduced scale so as to show its principal members necessary for the understanding of the operation of the machine.

FIG. 7 is a view in perspective showing the accessory according to the second form of construction once mounted on a sewing machine shown partly.

FIG. 8 is a view in axial section of said accessory.

FIG. 9 is a developed view of the profile of the auxiliary cam which is comprised by said accessory.

FIG. 10 is a diagram showing the accessory according to the second form of construction in position on the sewing machine, a portion thereof being drawn to a reduced scale so as to show the principal members necessary for the understanding of the operation of the machine.

Figure 5:
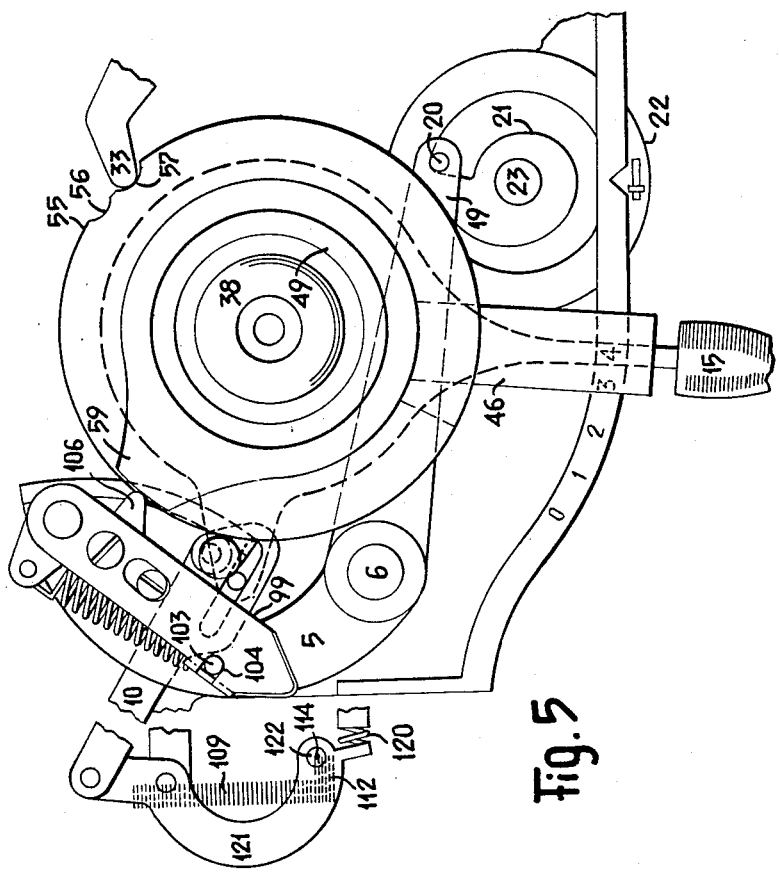
FIGS. 5 and 6 are views similar to the preceding ones, showing the sewing machine and its accessory in two other phases of their operation.

The machine shown only partly in FIG. 1 of the accompanying drawing is a sewing machine of the type with direct control of the character of that described in a detailed manner in U.S.A. Patent No. 2,682,845.

In a sewing machine of this character the needle bar which is mounted in such a manner as to be capable of being driven in an axial to-and-fro movement in a support oscillating relatively to the framework of the machine, is capable of being subjected to lateral movements controlled from a primary cam 1, driven in continuous rotation by a driving shaft of the machine, for example the shaft controlling precisely the axial to-and-fro movements of the needle bar. The driving of the needle bar in lateral movements is effected through the medium of a feeler finger 2 secured to an arm 3 hinged at 4 relatively to a support 5 of the mechanism of the sewing machine. In the particular case, said support 5 is formed by a lever capable of occupying various angular positions about the spindle 6 stationary relatively to the framework 7 of the machine. The arm 3 has a sliding surface 8 in contact with which is a roller 9 carried by the end of a rod 10 subjected to the action of a spring 120 (FIG. 4) tending to urge it in the direction of the arrow shown thereon. The other end of said rod 10 is hinged at 123 on the support 121 located in the head of the sewing machine, the support 121 oscillating about a spindle 124 and in which the needle bar 122 slides axially.

The lateral position of the roller 9 is determined by a slide 12 provided at the end of the rod 10 and with which engages a finger 11 forming part of a member capable of sliding angularly about the axis of rotation 13 of the primary cam 1 through the medium of an arm 14 of which the end carries a manual adjusting member 15.

The manual adjusting member 15 is mounted on the arm 14 in such a manner as to be capable of moving axially thereon. In FIG. 1, the member 15 is shown in its extreme outer position. As will be seen in this figure, said member 15 has a part in the form of a wedge 16 adapted to cooperate with notches 17 provided in one of the edges of a slot 18 of the framework of the machine, for fixing the arm 14 and thus the slide 12 in position. The fixing in position of the arm can thus be effected when the member 15 is pushed towards the interior of the machine in such a manner that its wedge 16 engages in the notches 17. Said arm 14 is also provided with a resilient part allowing the wedge 16 to jump from one notch 17 to the other without it being necessary to withdraw the member 15 towards the outside.

In a sewing machine of this character, the impulses imparted by the teeth of the primary cam 1 to the feeler finger 2 are transmitted to the roller 9 and thus to the needle bar in a ratio of transmission dependent on the position of the roller 9 along the slide 8, therefore on the position of the adjusting member 15 along the slot 18 of the framework 7.

This machine also comprises a device allowing of varying the center position of the needle relatively to the needle hole plate. In fact, the lever 5 is provided at the end of its arm 19, with a rod 20 held in contact with the profile of a cam 21 hollowed in the interior of an operating member 22 rotatably mounted about a spindle 23 stationary relatively to the framework 7. A weak spring 24, hooked, on the one hand, at 25 to the framework 7, and on the other hand, to a screw 26 secured in the end of the arm 19, maintains the rod 20 in contact with the cam 21. The rod 20 is capable of being adjusted in position at the end of the arm 19 by reason of an eccentric device 20a locked in position by a screw 26. The position of the hinge axis 4 of the arm 3 thus depends on the position of the control wheel 22. In the construction shown, when the control wheel 22 is moved into its extreme position after rotation in a clockwise direction, the needle is centered at the left-hand end of the needle hole; with the extreme opposed angular position of the wheel 22 corresponds a centering of the needle at the right-hand end of the needle-hole.

Said sewing machine is also provided with a mechanism enabling the amplitude of the movements of the feeder as also the direction of said movements to be varied. Said mechanism is capable of being adjusted manually by means of an operating member, not shown, acting on a control shaft 27 turning in bearings 28 provided in the said framework of the machine. Further, in this machine, a mechanism permits of controlling, in an automatic manner, the variations in amplitude and direction of the movements of the feeder. Said mechanism has been illustrated succinctly in FIG. 1 in which will be seen that the shaft 27 carries at its upper end a fork 29 constituting a slide for a finger 30 carried by the end of one of the arms of the lever 31 of which the end of the other arm 32 forms a feeler member 33 of a control cam, not shown, of the type of the primary cam 1, driven in rotation simultaneously with said primary cam 1. Said lever 31 is hinged on a spindle 34 carried by an arm 35 pivotally mounted on a spindle 36 fixed relatively to the framework of the machine. A stop 37, of which the position is controlled by the manual member controlling the variations in amplitude and in direction of the feeder, is provided for fixing the arm 35 in the position for which the feeler finger 33 is caused to follow the contour of its corresponding cam, not shown in FIG. 1, under the action of a spring, not shown, tending to cause the shaft 27 to turn in the direction of the arrow shown thereon.

The primary cam 1, as also the cam capable of being eventually mounted thereon for the control of the feeder, are mounted in position on their driving shaft 13 by means of a spring clutch mechanism controlled by the knob 38. Said spring clutch mechanism has not been shown in a detailed manner in view of the fact that it forms the subject of another patent of the applicant.

As will be seen in FIG. 1, an arm 99 is hinged to the end of the lever 5 on the extension of the hinge spindle 4. Said arm 99 is extended by a resilient blade 100 of which the position relatively to the arm 99 may be adjusted by means of an eccentric 101 and may be secured by means of a screw 102. The lever 5 carries a stop rod 103 adapted to co-operate with a hole 104 and the edge of the blade 100 so as to be capable of securing the arm 99 in two angular positions. An extension 106 of said arm 99 constitutes a feeler finger which is in the inoperative position, when the edge 105 comes to bear against the rod 103 (see FIG. 1). The active position of said feeler finger 106 is obtained when the rod 103 is engaged in the hole 104 after movement of the arm 99 in an anti-clockwise direction (see FIG. 3).

A spring 125 is hooked, at one end, to the rod 103 and, at the other end, to a lug 126 of the arm 99. Said spring 125 tends to cause the arm 99 to pass from its retracted position, shown in FIG. 1, to its operative position, shown in FIGS. 3 to 6 and 7 and 10 to 12, respectively.

As is clearly seen in FIGURE 1, the extension 10a is integral with rod 10 joined at 123 to the oscillating support 121 in which the needle-bar slides vertically. Said oscillating support 121 is mounted so as to oscillate about axis 124 held in fixed position with respect to the machine framework. As is clearly seen, needle-bar 122 slides in two bearings 195 and 196 carried by support 121, and needle 127a is attached in the usual manner to the lower end 128a of needle-bar 122. Beneath needle 127a is needle-hole plate 129a, the conveying teeth appearing through holes 131 of plate 129a.

The sewing machine above described with reference to FIG. 1 is adapted to be completed by an accessory adapted to be engaged on the driving shaft 13 after having removed the independent primary cam 1 shown in FIG. 1.

Said accessory, which is shown in FIGS. 2 to 6 (first form of construction), comprises a sleeve 41 having a flange 42. Against this flange 42 is secured, by means of the screw 44, a primary cam 1a of the same type as the primary cam 1 shown in FIG. 1. Around said sleeve 41 is engaged a part 45 having a portion of the shape of the arm 46 terminated by a fork 47. Said part 45 is also provided with a part in the form of a ring 48 bearing against the flange 42 whilst being capable of turning freely around the sleeve 41. A sleeve 49 is fitted on the sleeve 41 and maintained in position on this by a resilient washer 50 engaged in a groove 51 provided at the upper end of the sleeve 41. Said sleeve 41 is also provided with an internal shoulder 52 enabling it to be hooked on the driving shaft 13. A notch 53, provided radially in the lower end of the sleeve 41, is provided for co-operation with the driving pin 43 shown in FIG. 1.

The cam 1a thus has a profile identical with that of the primary cam 1, that is to say a profile adapted to impart to the needle bar a lateral regular to-and-fro movement permitting of a regular zig-zag sewing.

Figure 6:
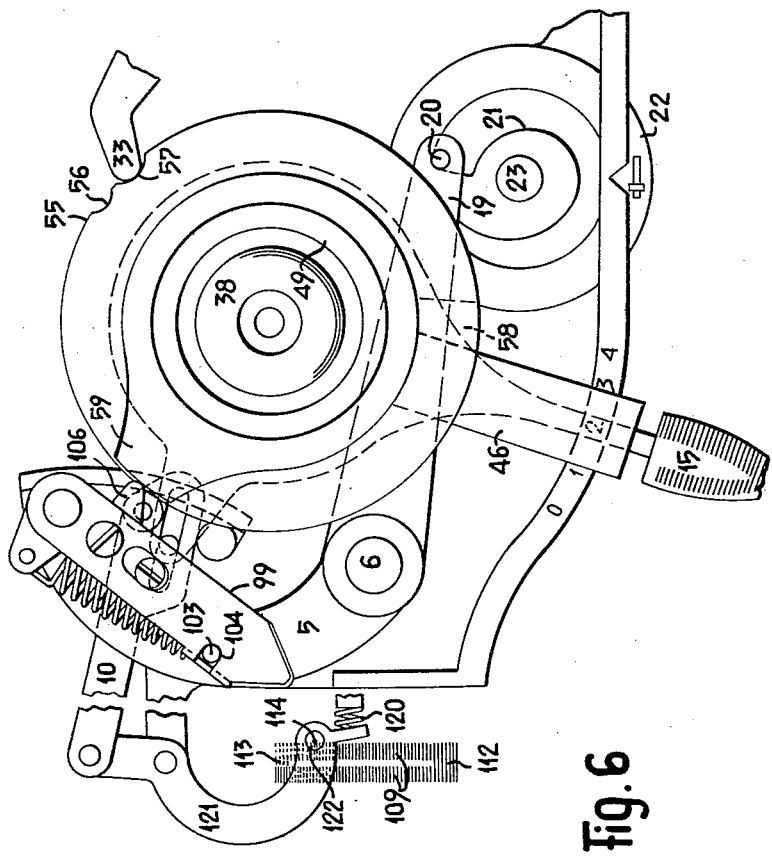

The sleeve 49 is provided at its lower end with a flange 54 of which a portion of the periphery constitutes an auxiliary control plate 55 adapted to co-operate with the feeler member 33 controlling the variations in amplitude and direction of movement of the feeder. As shown in FIGS. 4 to 6, said auxiliary control plate 55 has a periphery provided with two notches 56 and 57, of different depths. The notch 56 is hollowed in such a manner as to impart to the control mechanism of the feeder a uniform forward movement of small amplitude, in such a manner as to obtain the tightened points of a side of the button-hole. The notch 57 is recessed in such a manner as to impart a regular return movement of the feeder, of the same amplitude as the forward movement produced by the notch 56.

Further, a notch 58 is provided in the front end of the sleeve 49, in such a manner as to serve as a seating for the arm 46. As shown in FIGS. 4 to 6, said notch 58 has a width greater than the width of the arm 46, so that a predetermined angular clearance exists between the arm 46 and the sleeve 49 during the driving of the said sleeve by the arm 46. On the other hand, a projection 59 is provided at the periphery of the upper end of the sleeve 49. Said projection 59 is thus solid with the auxiliary control plate 55. It is adapted to co-operate with the feeler finger 106 for the control of moving out of centre the needle of the sewing machine (see FIGS. 5 and 6).

The accessory shown in FIGS. 2 to 6 is thus adapted to be engaged on the driving shaft 13 in such a manner that the driving pin 43 engages in the notch 53 and the fork 47 of the arm 46 engages around the part 16 of the control member 15.

The utilisation of the sewing machine equipped with the accessory above described, for the sewing of button-holes, is effected in the following manner:

The fabric being in position under the claw foot, and the accessory being engaged on the driving shaft 13, the feeler finger 106 is first placed in the active position by moving the blade 100 in such a manner as to bring its hole 104 into coincidence with the rod 103. On the other hand, the wheel 22 is turned in a clockwise direction relatively to FIG. 1, so as to center the needle 114 to the left relatively to the needle hole. The adjusting member 15 coupled to the arm 46 is then moved from the position 0 to the position 2. During this angular movement of the member 15, the arm 46 is moved simultaneously, and entrains the sleeve 49 carrying the auxiliary control plate 55. The notch 56 is provided on said auxiliary control plate 55 in such a manner that the feeler finger 33 penetrates into the said notch when the adjusting member 15 is located in position 2. It will be understood that, in order that the feeler 33 follows the contour of the control plate 55, it is necessary to engage the mechanism for the automatic control of the variations in movement of the feeder provided in the sewing machine described in U.S.A. Patent No. 2,682,845.

The control mechanism of the sewing machine thus occupies the position shown in FIG. 4. When the machine is set in operation, the cam 1a produces an oscillation movement of the support 121 applying lateral movements to the needle bar of an average amplitude equal to the width of a lip 109 of a button-hole. The depth of the notch 56 determines a uniform feed of the fabric entrained by the feeder in such a manner as to obtain a series of points, which are in close proximity to one another.

When the user considers that the length of the lip 109 which has been made is sufficient, the adjusting member 15 is moved so as to cause it to pass from position 2 to position 4 (see FIG. 5). During this movement of the member 15, the arm 46 moves the control plate 55 angularly, so that the notch 57 is located opposite the feeler finger 33. Similarly, the projection 59 pushes against the feeler finger 106, thus producing an angular movement of the lever 5 in a counter clockwise direction. Thus the needle 114 is centered to the right in the needle hole. Further, the depth of the notch 57 is so selected as to provoke a return movement of the fabric entrained by the feed at the same rate as the feed movement during the first side 109 of the button-hole has been stitched. Further, as the member 15 is located in position 4, the cam 1a produces lateral movements of maximum amplitude of the needle bar 122. The machine then sews zig-zag points of large amplitude, constituting the connecting points 112 closing one of the ends of the button-hole.

When the number of points 112 is judged sufficient, the user of the machine moves the adjusting member 15 from the position 4 to the position 2. The width of the notch 58 is made sufficient so that the angular movement of the member 15 and of the arm 46 does not produce any angular movement of the sleeve 49 and of the cam 55. Thus, the feeler finger 33 remains engaged in the notch 57, whereby the return movement of the fabric moved by the feeder is maintained. Further, the feeler finger 106 remains in contact with the pin 59, thus also maintaining the centering to the right of the needle 114 in the needle hole. The control members of the sewing machine thus occupy the position shown in FIG. 6, and the machine stitches the regular and close zig-zag points forming the second side of the button-hole.

When the needle 114 approaches the initial end of the first side 109, the user returns the member 15 into position 4 so as to form zig-zag points of large amplitude constituting the connecting points 113 forming the second end of the button-hole.

The fabric can then be disengaged from the sewing machine and it suffices for the user of the machine to cut this between the two sides 109 of the button-hole so that this is completed.

When a fresh button-hole is to be produced by the machine, the user returns the member 15 to position 0 in such a manner as to drive the sleeve 49 in a clockwise direction for disengaging the finger 106 from the pin 59, as also the feeler finger 33 from the notches 56 and 57 of the control plate 55. Then the member 15 is returned to position 2 so as to bring the notch 56 into coincidence with the feeler finger 33. The machine is thus ready for sewing a second button-hole.

When the user of the machine desires to remove the accessory therefrom, the adjusting member 15 is first moved into position 0. The feeler finger 106 is then moved into the inoperative position by lifting the blade 100 in such a manner as to bring the edge 105 of this against the rod 103. The operating member (not shown) of the feed mechanism is then actuated in such a manner as to produce a withdrawal of the feeler finger 33 away from the control plate 55. It then suffices to apply pressure on the knob 38 so as to produce the ejection of the accessory from the driving shaft 13.

It is to be observed that the notches 56 and 57 not only impart to the feeder the desired movements but also ensure the stable maintenance of the auxiliary control plate 55 in each of its two active positions by the engagement of the feeler finger 33 in the said notches 56 and 57. Thus the auxiliary control plate 55 does not risk being displaced angularly by the sleeve 41 which is driven in movement during the operation of the sewing machine.

Numerous modifications in the construction of the accessory above described may be contemplated. Thus in a simplified form of construction the sleeve 49 may not be provided with the pin 59, the machine also being not provided with the feeler finger 106 carried by the arm 99. In this case, after having stitched the first side 109 of a button-hole, the user of the sewing machine should actuate the wheel 22 for producing the centering to the right of the needle 114 in the needle hole, which to some extent complicates the manipulation of the machine.

In another form of construction of the accessory, the cam 1a may be independent of this in such a manner as to rest on the sewing machine, as shown in FIG. 1. The lower end of the sleeve 41 need not necessarily be provided with the notch 53 engaging with the driving pin 43, said sleeve 41 then only constituting a simple means of centering the sleeve 49 around the driving spindle 13.

It is to be observed that the feeler finger 106, provided in the sewing machine shown only partially in FIG. 1, need not necessarily be made movable. In fact the device including the parts 99 to 106, including the spring 125, may be omitted, a simple stationary boss being capable of being provided at the corresponding end of the lever 5 for co-operating with the projection 59.

The details of the sewing machine on which is adapted to be mounted the second form of construction of the accessory shown in FIGS. 7 to 12, as also the essential parts of this accessory bear references identical with those used in FIGS. 1 to 6. The operation of the sewing machine provided with the accessory according to the second form of construction will only be indicated on broad lines hereinafter, in view of the fact that this operation has been explained clearly above with reference to FIGS. 1 to 6.

The principle of operation of the accessory shown in FIGS. 7 to 12 of the accompanying drawings is therefore identical with that described with reference to FIGS. 1 to 6. Said latter accessory differs from that previously described solely by the fact that it comprises a selection device carried by its member 45—47 serving as connecting member between the auxiliary control plate 55 and the adjusting member 15 permitting of varying the amplitude of the lateral movements of the needle bar of the sewing machine. Said selection device is for the purpose of enabling the auxiliary control plate 55 to be moved into more than two combined active angular positions, so that the contour of the auxiliary control plate 55, by acting on the mechanism 27—37 for adjusting the amplitude and the direction of the movements of the feeder of the machine, can control equal movements of advance and return of the feeder, of diverse amplitudes.

In the form of construction shown in FIGS. 7, 8 and 10 to 12, said selection device comprises a lever 127 hinged to the connecting member 45—47. In fact, said member 45—47 is provided laterally with two lugs 128 carrying the hinge axis 129 of the lever 127. A finger 130 is secured to one of the arms of the lever 127, the other arm of the latter constituting an operating member for the selection device. A clamping spring 131 is fitted on the spindle 129 and tends to maintain the lever 127 in the position shown in FIG. 8, in which position the finger 130 abuts against the edge of a hole 132 drilled in the part 45. Said finger 130 is adapted to co-operate with notches 133, 133', 133", provided in the edge of the flange 54.

With each notch 133 corresponds a pair of combined notches 56, 57 provided on the profile of the control plate 55 and adapted to impart to the feeler finger 33 the positions controlling a regular movement of advance and a regular movement of return of the same amplitude of the feeder.

The profile of the control plate 55 has been shown in developed form in FIG. 9 so as to show clearly how the different groups of combined notches 56, 57, 56', 57' and 56", 57", have been established. In this FIG. 9, the chain-dotted line 134 indicates the position for which the feeler finger 33 does not produce any advance or return movement of the feeder, that is to say the position 0 or the neutral position. The more the bottom of the notches 56 and 57, and 56', 57', 56", 57" respectively, is close to this line 134, the smaller is the amplitude of the movement imparted to the feeder, and thus the tighter the points stitched by the machine.

In order that the amplitude of the advance movements of the feeder are quite equal to the amplitude of its return movements, which is a primordial condition for the production of two identical sides for each button-hole, the distance $a$ separating the bottom of a notch 56" from the line 134 should be equal to the distance $b$ separating the bottom of the combined notch 57" from the line 134.

As will be seen in FIG. 9, the combined notches 56 and 57 are provided for controlling an advance and a return respectively of the feeder, which allows of the production of button-holes in an ordinary fabric of relatively thin thickness.

However, when it is desired to make button-holes in a fabric of average thickness, or even considerable thickness, it is necessary that the feeder produces an advance and return movement respectively, which is greater when the fabric is thicker. This is due to the fact that the feed of a thick fabric in a sewing machine always takes place with a predetermined sliding which is the more marked when the fabric is thicker. It is for this reason that the combined notches 56' and 57' are hollowed whilst leaving a space $a$, $b$ respectively, from the neutral line 134, which is larger than in the case of combined notches 56 and 57. The notches 56" and 57" are hollowed, whilst leaving a spacing $a$ and $b$ respectively, which is larger between the neutral line 134 and the bottom of said notches. Said latter combined notches 56" and 57" are particularly suitable for making button-holes in a very thick fabric.

The selection of one or other of the combined notches 56, 57, 56', 57' and 56", 57" is thus effected by engaging the finger 130 in the corresponding notch 133, 133' or 133" according as to whether the button-holes are to be formed in a thin, average thick, or very thick fabric.

In FIGS. 7 and 10 to 12 of the accompanying drawing the accessory is shown when the finger 130 is engaged in the notch 133" for making button-holes in a very thick fabric.

The use of the sewing machine equipped with the accessory above described and in the operative position shown in FIGS. 7 and 10 to 12, for sewing a button-hole, is carried out in the following manner:

The fabric being in position under the claw foot, and the accessory being engaged on the driving shaft 13, the feeler finger 106 is first moved into the operative position by moving the blade 100 in such a manner as to move its hole 104 in coincidence with the rod 103. On the other hand, the wheel 22 is turned in a clockwise direction in such a manner as to center the needle to the left relatively to the needle hole. The adjusting member 15 coupled to the arm 46 is then moved from the position 0 to the position 2. During this angular position of the member 15, the arm 46 is moved simultaneously and drives, through the medium of the finger 130 co-operating with the edge of the notch 133", the sleeve 49 carrying the auxiliary control plate 55. The notch 56" is provided on said auxiliary control plate 55 in such a manner that the feeler finger 33 penetrates into the said notch when the adjusting member 15 is in position 2. It will be understood that in order that the feeler finger 33 follows the contour of the control plate 55, it is necessary to engage the automatic control mechanism of the variations of movement of the feeder provided in the sewing machine described in the above-mentioned U.S.A. Patent No. 2,682,845.

The control mechanism of the sewing machine then occupies the position shown in FIG. 10. During the setting in operation of the machine, the cam 1a provokes an oscillation movement of the support 121 imparting to the needle bar 122 lateral movements of an average amplitude equal to the width of a side 109 of a button-hole. The depth of the notch 56" determines a regular feed of the fabric moved by the feeder in such a manner as to obtain a series of points located close to one another on the selected thick fabric.

Figure 11:
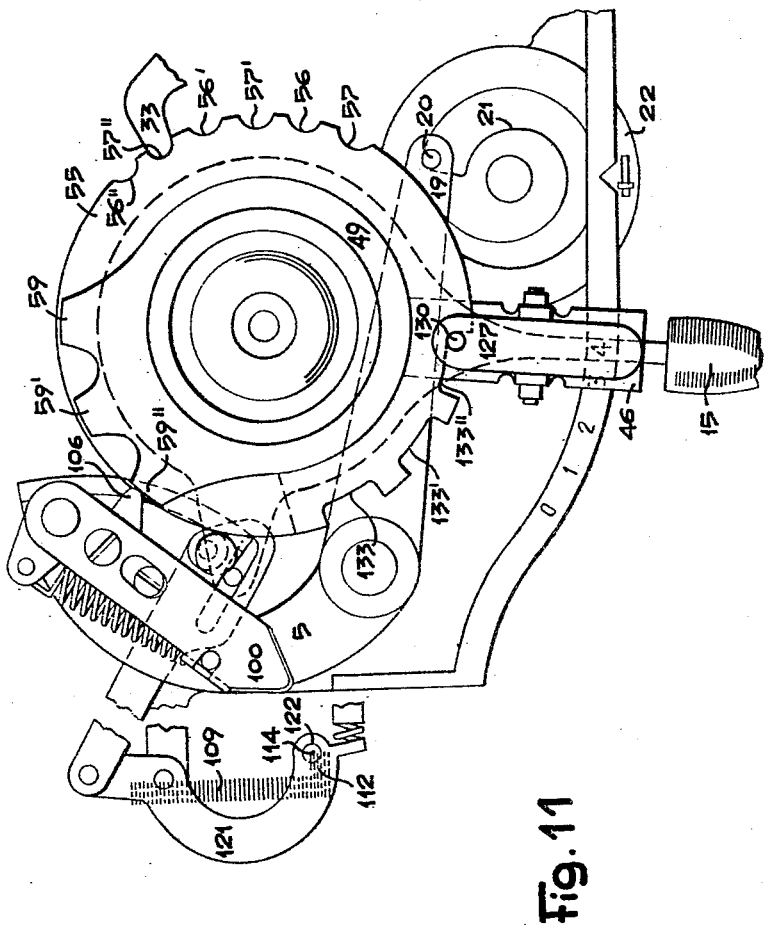
FIGS. 11 and 12 are views similar to the preceding ones, showing the sewing machine and its accessory in two other phases of their operation.
Figure 12:
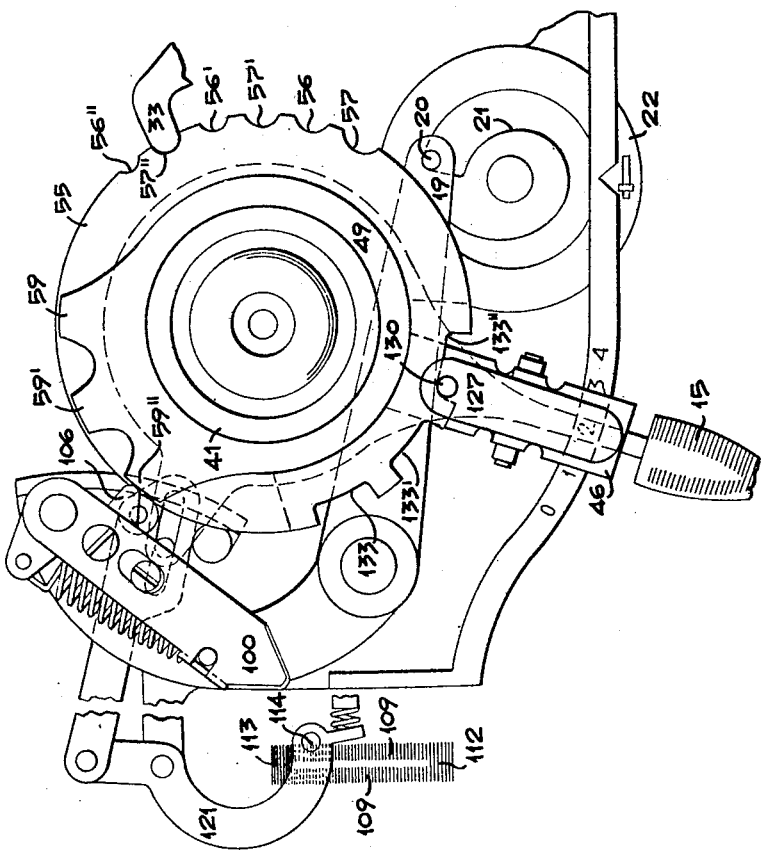

When the user considers that the length of the completed side 109 is sufficient, the adjusting member 15 is moved so as to cause it to pass from position 2 to position 4 (see FIG. 11). During this movement of the member 15, the arm 46 moves the control plate 55 angularly so that the notch 57" is opposite the feeler finger 33. Similarly the pin 59" abuts against the feeler finger 106, thus producing an angular movement of the lever 5 in a counter-clockwise direction. Thus, the needle 114 is centred to the right of the needle hole. Further, the depth of the notch 57" is selected in such a manner as to produce a return movement of the fabric entrained by the feeder at the same rate as the feed movement during which there has been stitched the first side 109 of the button-hole. Further, as the member 15 is in position 4, the cam 1a produces lateral movements of maximum amplitude of the needle bar 122. The machine then sews zig-zag points of large amplitude, constituting the connecting points 112 closing one of the ends of the button-hole.

When the number of points 112 is deemed to be sufficient, the user of the machine moves the adjusting member 15 from the position 4 to the position 2. The width of each notch 133 is made sufficient so that this angular movement of the member 15 and of the arm 46 does not produce any angular movement of the sleeve 49 and of the control plate 55. Thus the feeler finger 33 remains engaged in the notch 57″, thereby maintaining the return movement of the fabric entrained by the feeder. Further, the feeler finger 106 remains in contact with the pin 59″, which also maintains the centering to the right of the needle 114 in the needle hole. The control members of the sewing machine thus occupy the position shown in FIG. 12 and the machine stitches the regular and tightened zig-zag points forming the second side 109 of the button-hole.

When the needle 114 approaches the initial point of the first side 109, the user returns the member 15 to position 4 in such a manner as to form zig-zag points of large magnitude constituting the connecting points 113 closing the second end of the button-hole.

The fabric can then be disengaged from the sewing machine and it suffices for the user of the machine to cut this between the two sides 109 of the button-hole so as to complete this.

When a new button-hole is to be made by the machine, the user returns the member 15 to position 0 in such a manner as to entrain the sleeve 49 in a clockwise direction for disengaging the finger 106 from the pin 59″, and also the feeler finger 33 from the notches 56″ and 57″ of the control plate 55. Thereupon, the member 15 is returned to position 2 so as to bring the notch 56″ into coincidence with the feeler finger 33. The machine is thus ready for sewing a second button-hole.

It is to be observed that the notches 56, 57, 56′, 57′ and 56″, 57″ not only impart to the feeder the desired movements but also ensure the stable maintenance of the auxiliary control plate 55 in each of its two combined active positions by engagement of the feeler finger 33 in the said notches 56 and 57. Thus the auxiliary control plate 55 is not liable to be moved angularly by the sleeve 41 which is driven in movement during the operation of the sewing machine.

Numerous variations in construction of the accessory according to the second form of construction described above and particularly of its selection device, may be imagined. Thus, for example, the finger 130, instead of being carried by a lever 127 hinged to the member 45—47, may be mounted for sliding in a support secured to said connecting member 45—47. This sliding movement of the finger 130 may take place either parallel to the axis of rotation 13, or radially relatively to the control plate 55 and to the notches 133.

In the example shown in FIGS. 7, 8 and 10 to 12, the selection device enables the auxiliary control plate 55 to be moved into three angular zones corresponding to three groups of combined positions 56, 57, 56′, 57′ and 56″, 57″. However, it will be understood that the accessory can only be provided for two groups of combined positions 56, 57, or eventually for more than three groups.

I claim:

1. In a zig-zag sewing machine comprising a laterally to-and-fro movable needle-bar having a needle positioned therein, a needle-hole plate member positioned opposite and below said needle-bar having said needle positioned therein, a spring-urged feeler finger member means for controlling the lateral movements of said needle-bar, a hinge axis for said feeler finger member means, an adjusting lever means for varying the width of said lateral movements, means for varying the centering position of said needle-bar having said needle positioned therein with respect to said needle-hole plate, said means comprising a support member carrying said hinge axis for said feeler finger member means and a wheel means for positioning said support member in various positions, a feeder member, means for regulating variation of the amplitude and direction of the movements of said feeder member, and an accessory driving shaft; an accessory operatively associated with said driving shaft for making buttonholes comprising, in combination, a rotary primary cam means for imparting a lateral regular to-and-fro movement to said needle bar, said primary cam means contacting at its peripheral cam surface said feeler finger member means, an auxiliary control plate operatively associated with said driving shaft, said auxiliary control plate being capable of occupying at least two working positions, said auxiliary control plate acting at its peripheral cam surface on the means for regulating variation of the amplitude and direction of the movement of said feeder member, a projection on said auxiliary control plate, said projection acting on the means for varying the centering position of said needle-bar with respect to said needle-hole, an arm means for driving said auxiliary control plate angularly, said arm means having a forked portion at its end, said arm means being coupled at its forked portion with said adjusting lever means for varying the width of the lateral movements of the needle-bar, the position of said auxiliary control plate being dependent on the position of said adjusting lever means.

2. In a zig-zag sewing machine comprising a laterally to-and-fro movable needle-bar having a needle positioned therein, a needle-hole plate member positioned opposite and below said needle-bar having said needle positioned therein, a spring-urged feeler finger member means for controlling the lateral movements of said needle-bar, a hinge axis for said feeler finger member means, an adjusting lever means for varying the width of said lateral movements, means for varying the centering position of said needle-bar having said needle positioned therein with respect to said needle-hole plate, said means comprising a support member carrying said hinge axis for said feeler finger member means and a wheel means for positioning said support member in various positions, a feeder member, means for regulating variation of the amplitude and direction of the movements of said feeder member, and an accessory driving shaft; an accessory operatively associated with said driving shaft for making buttonholes comprising, in combination, a primary cam means for imparting a lateral regular to-and-fro movement to said needle bar, said primary cam means contacting at its peripheral cam surface said feeler finger member means, an auxilitary control plate capable of occupying at least two working positions, said auxiliary control plate acting at its peripheral cam surface on the means for regulating variation of the amplitude and direction of the movement of said feeder member, a projection on said auxiliary control plate, said projection acting on the means for varying the centering position of said needle-bar with respect to said needle-hole, an arm means for driving said auxiliary control plate angularly, said arm means being coupled with said adjusting lever means for varying the width of the lateral movements of the needle-bar, the position of said auxiliary control plate being dependent on the position of said adjusting lever means, a sleeve means for supporting said auxiliary control plate, said sleeve means being engaged on said accessory driving shaft, said first cam means being integral with said sleeve means, said auxiliary control plate having a first notch in its peripheral surface, said arm means engaging said auxiliary control plate in said notch, said arm means being hinged around said sleeve means, whereby said arm means drives said auxiliary control plate when said arm means contacts the walls of said notch.

3. The accessory of claim 2 wherein said auxiliary control plate has two adjacent notch means on its peripheral surface spaced from said first notch for positioning said auxiliary control plate in two angular work positions and for stabilizing said control plate in each of said two work positions when said sleeve means is driven, said means for allowing variation of the amplitude and direction of movement of said feeder member engaging said auxiliary control plate at one of said two adjacent notch means.

4. The accessory of claim 3 including a selector means for positioning said auxiliary control plate in more than two angular working positions, said selector means being carried by said arm means, said arm means being positioned between said auxiliary control plate and said regulating lever means, said auxiliary control plate having a plurality of first notches in said auxiliary control plate in its peripheral surface and a plurality of pairs of adjacent notch means on the peripheral surface of said auxiliary control plate spaced from said plurality of first notches for positioning said auxiliary control plate in a plurality of angular work positions and for stabilizing said auxiliary control plate in one of said plurality of work positions when said sleeve means is driven, each pair of said adjacent notch means corresponding to one of said first notches, each one of one pair of said adjacent notch means being of a different depth on the peripheral surface of said auxiliary control plate, a plurality of projecting means for actuating said means for varying the centering position of said needle-bar with respect to said needle-hole plate, the number of said projecting means being equal to the number of said first notch means, whereby various amplitudes of movement of said feeder member are selected, said selector means including a finger member engaging a predetermined first notch means.

5. The accessory of claim 4 wherein said selector means includes a lever member hingedly mounted on said arm means, said lever member having at least two arms, said finger member being carried by one of said two arms of said lever member, the other arm of said lever member constituting an operating member of said selector means.

References Cited in the file of this patent

UNITED STATES PATENTS

| | | |
|---|---|---|
| 573,881 | Jagielski | Dec. 29, 1896 |
| 2,682,845 | Casas-Robert et al. | July 6, 1954 |
| 2,684,649 | Scarpa | July 27, 1954 |
| 2,755,754 | Urscheler | July 24, 1956 |
| 2,764,895 | Bono | Oct. 2, 1956 |

FOREIGN PATENTS

| | | |
|---|---|---|
| 535,025 | Italy | Oct. 31, 1955 |

UNITED STATES PATENT OFFICE
CERTIFICATION OF CORRECTION

Patent No. 3,009,429            November 21, 1961

Marcel Fresard

It is hereby certified that error appears in the above numbered patent requiring correction and that the said Letters Patent should read as corrected below.

In the heading to the printed specification, line 9, for "Aug. 19, 1956" read -- August 9, 1956 --.

Signed and sealed this 24th day of April 1962.

(SEAL)
Attest:

ESTON G. JOHNSON            DAVID L. LADD
Attesting Officer            Commissioner of Patents